May 27, 1947.　　　G. H. FROELICH　　　2,421,254

WHEEL AND SHAFT ASSEMBLY MEANS

Filed Aug. 24, 1944

INVENTOR.
GUSTAVE H. FROELICH
BY
ATTORNEY

Patented May 27, 1947

2,421,254

UNITED STATES PATENT OFFICE 2,421,254

WHEEL AND SHAFT ASSEMBLY MEANS

Gustave H. Froelich, Torrington, Conn., assignor to The Torrington Manufacturing Company, Torrington, Conn., a corporation of Connecticut Application August 24, 1944, Serial No. 551,033

8 Claims. (Cl. 287—53)

This invention relates to improvements in wheel and shaft assembly means, and more particularly to an improved hub and shaft connection for use with any of a number of different types of shaft mounted rotary elements, particularly but not exclusively, centrifugal blower wheels, propeller type fans and the like.

The more prevalently utilized hub and shaft assembly means, are set screws, shaft keys and the like, utilized to prevent angular and axial displacement of a shaft and a hub provided with a shaft bore. These well-known and long-used expedients, while adequately serving solely their intended purpose of shaft and hub securement, present an inherent difficulty in that they introduce an out-of-balance condition in the rotating mass in which they are employed. This is particularly true of the conventional type of key, engaging slotted keyways in shaft, hub or both, and which, particularly in high speed rotating masses, necessarily and inherently produce an aggravated unbalanced condition. The same is true of set screws, particularly where only a single screw is employed. Even in conditions where a pair or more of set screws are utilized, it is impossible without extreme care, accurately to center the shaft in the hub bore, so that a great number of such assemblies operate either out of balance, or with the wheel in "cocked" relation to its shaft.

The present invention has as a general object, the elimination of the difficulties aforesaid, and the attainment and production of a hub and shaft fastening which is or may easily be inherently balanced, and which, without any niceties of adjustment, results in a close-to-exact centering of the shaft in the hub bore therefor.

Yet another object of the invention is attained in a hub and shaft assembly which realizes the objectives noted, and which facilitates both assembly and disassembly of hub and shaft.

A still further and important oject is attained in a device having the advantages and realizing the results noted, which may be produced entirely of parts easily fabricated with or in automatic screw machines or the like, and at a nominal cost, in fact in certain sizes, at costs comparable to set screw figures.

Yet another object is attained in a unique shaft and hub assembly means which provides a single rotatable actuator, such as a nut, for both applying to and removing from a wheel hub or the like, a centering bushing or sleeve.

A still further object of the invention is realized in a device for shaft and wheel assembly which may be applied to any general class of rotatable shaft mounted devices, such as propeller type fans, blower wheels, gears, clutch elements, etc., all herein for brevity and comprehensively referred to as "wheels."

An additional objective of the invention is attained in an improved construction of nut particularly adapted for use as a balanced hub nut, having portions susceptible of slight axial deformation for the purpose and with the result of imparting self-locking characteristics to the nut.

A still further object of the invention is attained in an improved connection in a wheel construction, of a wheel hub, to a web or plate element thereof, for example, in the assembly of hub and back plate of a centrifugal blower wheel.

The foregoing and numerous other objects will more clearly appear from the following detailed description of an exemplary embodiment of the invention, particularly when considered in connection with the accompanying drawing, in which.

Figure 1:
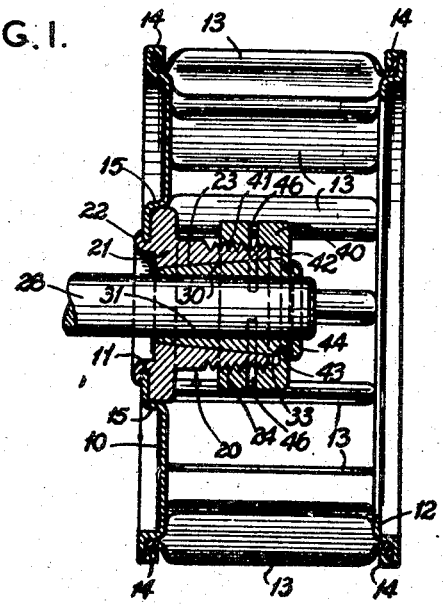
Fig. 1 is a section of a centrifugal blower wheel and shaft, shown partly in elevation, the sectional portions being taken in an axial plane.
Figure 2:
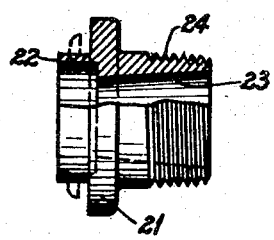
Fig. 2 is a side elevation, partly broken away for clearness, and partly in section, of a preferred form of hub element.
Figure 3:
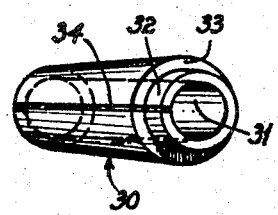
Fig. 3 is an isometric view of a tapered shaft sleeve utilized in the assembly of Fig. 1.
Figure 4:
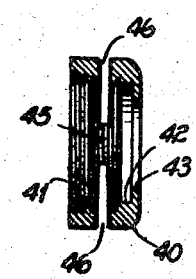
Fig. 4 is a sectional view, in an axial plane, of a hub nut of preferred form.
Figure 5:
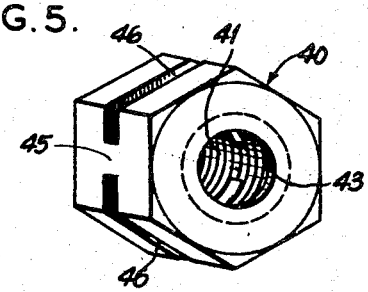
Fig. 5 is an isometric view of the hub nut.

Referring now by characters of reference to the drawing, there is illustrated an exemplary application of present improvements as utilized for the assembly of a centrifugal blower wheel to a rotatable shaft on and by which the wheel is rotatably mounted. For completeness it may be noted that the wheel includes an imperforate back plate 10 provided with an axial hub and shaft opening 11; opposite the back plate is an inlet ring or end ring 12, and mounted between the ring and plate is a generally cylindrical structure formed to provide a plurality of spaced blades 13, the lateral margins of the plate-forming portion being secured, as at 14, into assembly with the ring and plate.

It is a preference to provide in the back plate 10, and closely surrounding the hub opening 11, a depressed or recessed seat of a generally shallow, cylindrical form, for the reception of and attachment to the hub element to be described. This hub seat in the back plate 10 is peripherally defined by wall portions 15, which in section, would appear as substantially normal to the adjacent planar portions of plate 10, so as to present a right angular relation thereto. The bottom of this seat or cavity is formed by an additional annular planar portion extending from the right angular wall part 15, radially inwardly to the hub opening 11.

The hub proper of the wheel is indicated generally at 20, and by preference includes a plate seat portion or securement head 21. This is or may be of generally externally cylindrical form, and of a diameter such that it is snugly set into, firmly embraced and positively centered by the plate seat portion 15. The head 21 is preferably at least the depth of the plate seat. Extending axially in a direction outwardly of the wheel, is a portion 22, initially of a relatively reduced thickness and coaxial with the body of the hub 20. This extension is, incident to assembly, hammered, rolled, spun or otherwise deformed in a radially outward direction to form an annulus, which with the head 21, embraces the inner marginal portion of the plate hub seat, as will be apparent from the drawing.

It will have now appeared that the close centering fit between the hub seat identified with head 21, and the plate seat identified particularly with the wall portion 15, results in an extremely sturdy, permanent, and difficultly deformable hub and wheel attachment. It will be noted from the relation of parts that this attachment tends markedly to prevent any cocking tendency of the wheel, and assures, in a way not possible with bevelled or otherwise formed companion seats, the maintenance of the exactly centered relation of back plate, hence of wheel, and the hub proper.

Further describing the hub in more detail, it will be noted as a preference to provide this member with a tapered internal bore 23 for a purpose later better appearing, and to thread the otherwise free end of the hub, externally by preference, as indicated at 24.

The whole device as shown, is mounted on an end portion of a rotatabe shaft 26, powered by any suitable means (not shown).

Interfitting the tapered bore 23 of hub 20, is a tapered sleeve, bushing or tubular wedge element generally indicated at 30, and provided with a cylindrical bore 31 of a diameter which is even, to close tolerances, substantially from end to end of the sleeve. The varying thickness of wall of the element 30 extends from a zone somewhat inwardly of the end of the sleeve, preferably to its opposite end as shown, and preferably just beyond but adjacent the heavier end of the sleeve is a portion of reduced diameter 32, from which formation there results a right angle shoulder or abutment 33 for a purpose later appearing. The sleeve is preferably provided with a longitudinal incision such as a slot 34, and the sleeve is formed of a sufficiently resilient material or is so treated, that it is susceptible of diametral constriction or compression within the bore 23 of the hub. It is a preference to provide only a single slot 34, and so to determine the width of the slot that it is substantially the sum of tolerances of shaft, sleeve, and hub bore, from which it will now be obvious that when the sleeve 30 is assembled into and fully seated in bore 23, the slot 34 will be substantially, although preferably not quite completely, fully closed. This possesses the advantage of eliminating any possible unbalanced condition resulting from slotting of the sleeve since, when it is fully constricted, its mass is evenly disposed about its axis, being also the axis of rotation identified with the center of shaft 26.

Although the taper imparted to sleeve 30, which closely approximates also the taper of bore 23, is optional within reasonable limits, it is preferred that such taper be of the order of 5 degrees to 8 degrees inclusive, but more importantly such as to obviate any tendency of the sleeve to "freeze" in the bore in the event of requirement for removal of the wheel from the shaft for replacement or service attention. An optimum taper of both sleeve and hub bore, may be stated as approximating 7½ degrees.

As a means for inserting and preferably also for withdrawing the sleeve, there is provided in the example shown, a nut generally indicated at 40, and which may be of square, hexagon, cylindrical or of knurled or other desired type. The internal threads 41 of the nut extend over only a portion of the bore of the nut, so that beyond the threaded portion is an unthreaded part 42, and beyond the latter is formed an inturned annular flange 43. This flange, as will now appear, constitutes a companion abutment coacting with the shoulder 33 of the sleeve as the sleeve is forced into the bore of the hub 20 through coaction, as will now appear, of the threads 41 of the nut and the threads 24 of the hub. It is also a distinct preference to connect the sleeve 30 and nut 40 in a preliminary assembly operation, the better arrangement being to provide in the sleeve an annular groove in which is rotatively operable the inturned flange 43 of the nut. The annular groove is conveniently provided at a low cost by the metal of the reduced portion 32 of the sleeve. The latter is of such length as to extend appreciably beyond the nut, and is hammered, rolled or spun to form an external annulus or lip 44. Although the device is operative even though the annulus or lip 44 tightly embraces the flange 43 of the nut, it is preferred to spin this lip down only to a degree that the flange 43 floats in the resulting groove. This has been found to possess the distinct advantage of enabling rotation of the nut without the possibility of rotating, with much greater friction, the sleeve within the hub bore. It will now have been observed that in the event of removal of the wheel from the shaft, the nut flange 43 coacts with the spun lip 44, as an abutment in withdrawing the sleeve.

A further highly advantageous feature of the present assembly is embodied in a special formation of the nut 40, such that the latter is in effect a self-locking nut, and effectively prevents any tendency of vibration, through long periods of usage, to loosen the nut. This feature in the present embodiment consists in a plurality, preferably two, incisions of the nut body, each in a plane normal to the axis of the shaft, hence to the axis of the nut. These incisions (or divisions however produced) are preferably made medially of the length of the nut, or with some minor deviation from a median plane such as effectively to divide the threaded zone of the nut into both axially and angularly spaced threaded areas of nut bore. It is a further important preference, where this nut is employed in rotating apparatus as for wheel and shaft securement, to preserve the inherent balance of the nut by evenly angularly spacing the divided or partly severed nut portions. From this it results that, incident to threading up the nut, or otherwise if desired, the slotted angular zones of the nut become slightly axially deformed with respect to each other. The stock of which the nut is formed, is of sufficient resilience that the nut itself thus partakes of the characteristics of a lock washer, and once it is firmly threaded up, strongly resists any tendency to casual unthreading. It will be noted that, by the provision of only two of the slots or incisions in the nut, the self-locking effect above described is fully attained, and yet there remains for sturdy structural connection of the half portions of the nut, two substantial bridge pieces 45, the slots, shown as sawcuts, being indicated at 46. Each of the latter preferably extends in a direction radially inwardly from the periphery of the nut, in diametrally opposite zones, and into the bore of the nut.

A logical order of assembly of the parts and their function in usage, are thought to have been fully apparent from the foregoing description, but it may be noted that first assembly operations will usually consist of the attachment of hub 20 with its head or seat portion 21 firmly assembled in the seat 15 of the wheel backplate, followed say by spinning of the extended portion 22, resulting in the described annulus which serves to grip the metal margin about the hub opening 11 whereby there is assured permanence of assembly of the hub body and the wheel proper.

A further preliminary assembly of the parts in the form shown, may consist of application of the nut 40 over the reduced end of sleeve 30, followed say by spinning to form the lip 44, after which the rotatably related sleeve and nut are ready as an assembly for insertion over the end of shaft 26 with the wheel and hub in place thereon. Actuation of the nut 40 for threading it up on the hub threads 24, will now obviously serve to force the sleeve into the hub bore until it is brought into final position as shown, with the now obvious two-fold effect of tightly wedging the hub assembly to the shaft, and of definitely centering the hub, hence the wheel, in coaxial relation to the shaft.

It is important in assembly, particularly of higher speed blower wheels or the like, to obviate all avoidable sources of unbalance. It will have appeared that this result is admirably attained first, by design of each of the parts to that end, and secondly, in so assembling the parts that no unbalancing tendencies are introduced to the rotating system. This is true, for example, of the hub body 20 wherein the head 21 may be of circular external conformity, or if desired, of hexagonal or other polygonal shaping, but in any event with its mass evenly angularly distributed about its axis. The same is true, for reasons stated, of the tapered sleeve, particularly after substantial closing of the slot 34 by constriction of the sleeve within the hub bore. Likewise, the nut 40 is inherently in static and rotative balance, and the expedients of spinning over the extended reduced portion 22, and similarly forming the lip 44, all conduce to the final result of attaining a wheel, hub and shaft assembly which will usually require no separate or special balancing treatment.

It will now have appeared that the device as described will serve fully to attain each and all of the several objects particularly hereinabove expressed, and additionally offers many advantages in production and usage. Although the invention has been described by making reference to a single selected commercial embodiment, the detail of description is to be understood as instructive and not as limiting, inasmuch as many variants may be introduced without departing from the spirit and full intended scope of the claims. The following is claimed:

1. A wheel and shaft assembly including a wheel provided with a hub and a shaft extended through the hub, the hub being provided with a bore of longitudinally tapered aspect, a sleeve which is longitudinally tapered so that it conforms externally to the internal taper of the hub bore, the sleeve snugly embracing the shaft, the sleeve being provided with an annular shoulder and a nut threadedly engaging the hub and including an extension turned inwardly of its bore and axially spaced from the threads of the nut and engaging the shoulder of the sleeve as the nut is threaded up on the hub, whereby the nut serves upon being threaded up, to drift the sleeve into position within the bore of the hub.

2. Means for assembling a wheel element to a rotatable shaft, including a wheel hub having an externally threaded end portion, a nut threadedly engaging said end portion, the hub having a converging diameter inwardly of said threaded end portion, a tapered sleeve characterized by a longitudinal slot and a cylindrical bore adapted snugly to receive the shaft, the sleeve being tapered comformably to the hub bore, the nut having an inturned projection located axially beyond its threaded area, and the sleeve having an outwardly open annular groove to receive said projection and to permit relative rotative displacement of the nut and sleeve and to prevent relative axial displacement thereof whereby, on threading up the nut on the hub, the sleeve is forced into a wedging position between the hub and shaft, the sleeve being formed of a resilient material such as to permit its diametral constriction by virtue of the slot therein, as the nut is threaded up.

3. In a hub and shaft assembly, a hub provided with external threads and a tapered bore, a tapered sleeve interfitting said bore, the sleeve provided with a cylindrical bore for reception of the shaft, the sleeve having a reduced end portion extended substantially beyond the hub, a nut engaging the hub threads and having an internally projecting flange loosely embracing said reduced end portion of the sleeve, said reduced end portion being formed to constitute an annulus exteriorly of said nut flange and the nut being provided with a slot in a plane normal to its axis, to permit axial deformation of a portion of the nut tending to prevent unthreading thereof in assembly, the hub, sleeve and nut being formed and assembled to constitute a structure which is substantially in a condition of balance about its axis of revolution.

4. In a hub and shaft assembly, a hub provided with a tapered bore and external screw threads, a nut engaging the external threads of the hub, a tapered sleeve of a diametrally resilient characteristic, the taper of which conform substantially to that of the hub bore, and having, beyond its tapered portion, a portion of relatively reduced diameter, the nut having an inturned flange extended about said portion of reduced diameter, the last said portion extending axially beyond the nut flange and being formed to constitute an annulus on one side of the nut flange and, with the remainder of the sleeve, a peripheral sleeve groove in which the nut flange rotatably extends, the sleeve being longitudinally slotted from end to end, whereby, as the sleeve and hub are brought into operative relation by rotation of the nut, the sleeve is evenly constricted in diameter about the shaft and within the hub bore.

5. In a hub and shaft assembly, a hub provided with external threads and a tapered bore, a tapered sleeve interfitting said bore, the sleeve provided with a cylindrical bore for reception of the shaft, the sleeve having a reduced end portion extended substantially beyond the hub, a nut engaging the hub threads and having an internally projecting flange loosely embracing said reduced end portion of the sleeve, said reduced end portion being formed to constitute an annulus exteriorly of said nut flange and the nut having portions which are relatively axially displaceable, thus tending, upon such displacement, to prevent unthreading thereof in assembly, the hub, sleeve and nut being formed and assembled to constitute a structure which is substantially in a condition of balance about its axis of revolution.

6. In a hub and shaft assembly, a hub provided with a tapered bore and external screw threads, a nut engaging the external threads of the hub, a tapered sleeve of a diametrally resilient characteristic, the taper of which conforms substantially to that of the hub bore, and having beyond its tapered portion an annular groove, the nut having an inturned flange extended into and freely rotatable within the annular groove, the nut, flange and annular groove so coacting that rotation of the nut serves selectively to drive the sleeve into the hub or withdraw it therefrom, the sleeve being longitudinally slotted whereby, as the sleeve and hub are brought into assembled relation by rotation of the nut, the sleeve is constricted in diameter about the shaft and within the hub bore.

7. In a hub and shaft assembly, a hub provided with a tapered bore and external screw threads, a nut engaging the external threads of the hub, a tapered sleeve of a diametrally resilient characteristic, the taper of which conforms substantially to that of the hub bore, and having beyond its tapered portion an annular groove, the nut having an inturned flange extended into and freely rotatable within the annular groove, the nut, flange and annular groove so coacting that rotation of the nut serves selectively to drive the sleeve into the hub or withdraw it therefrom, the nut including relatively axially displaceable portions tending in assembly, to resist unthreading of the nut from the hub, the sleeve being longitudinally slotted whereby, as the sleeve and hub are brought into assembled relation by rotation of the nut, the sleeve is constricted in diameter about the shaft and within the hub bore.

8. In a hub and shaft assembly, an externally threaded hub having a tapered bore, a nut having a large diameter threaded bore and an apertured end, the passage through which is of small diameter, an externally tapered sleeve, of even internal diameter to receive the shaft, the sleeve provided with a peripherally grooved extension outside of the hub, with the small diameter portion of the nut freely rotatably engaging the groove in said extension, whereby to enable insertion and withdrawal of the sleeve into and from the hub as the nut is rotated.

GUSTAVE H. FROELICH.

REFERENCES CITED

The following references are of record in the file of this patent:

UNITED STATES PATENTS

| Number | Name | Date |
| --- | --- | --- |
| 1,499,873 | Ravier | July 1, 1924 |
| 123,413 | Newell | Feb. 6, 1872 |
| 258,797 | Newell | May 30, 1882 |
| 1,720,807 | Wackman | July 16, 1929 |
| 738,445 | Hoffmann | Sept. 8, 1903 |
| 726,336 | Ott | Apr. 28, 1903 |
| 1,371,212 | Adams et al. | Mar. 15, 1921 |
| 1,609,968 | Schroeder | Dec. 7, 1926 |
| 2,334,874 | Howsam | Nov. 23, 1943 |

FOREIGN PATENTS

| Number | Country | Date |
| --- | --- | --- |
| 37,046 | France (3d addition) | June 10, 1930 |
| 505,291 | Great Britain | May 9, 1939 |
| 235,716 | Germany | June 19, 1911 |